UNITED STATES PATENT OFFICE.

ALBERT PROCHOWICZ, OF WINONA, MINNESOTA.

OINTMENT.

SPECIFICATION forming part of Letters Patent No. 381,483, dated April 17, 1888.

Application filed October 11, 1887. Serial No. 252,055. (No specimens.)

*To all whom it may concern:*

Be it known that I, ALBERT PROCHOWICZ, a citizen of the United States, residing at Winona, in the county of Winona and State of Minnesota, have invented certain new and useful Improvements in Ointments; and I do declare the following to be a full, clear, and exact description of the invention, such as will enable others skilled in the art to which it appertains to make and use the same.

My invention relates to a new ointment; and it consists in the combination of the ingredients hereinafter mentioned for the purpose of providing a remedy for rheumatism, substantially as hereinafter specified.

In carrying out my invention I take, by measure, of melted beeswax two parts, of linseed-oil two parts, of melted rosin one part, of spirits of turpentine two parts, of oil of laurel two parts, of spirits of camphor two parts, of oil of spike one part, and of oil of juniper two parts. These substances are thoroughly mixed by shaking, stirring, or other proper means in a suitable vessel, and afterward bottled.

I do not desire to confine myself strictly to the proportions above mentioned, for I find they can be varied somewhat and still produce a valuable remedial agent; but I find by experiment that the proportions given are well adapted to the purpose and recommend that they be followed in preparing the compound.

The ointment is to be used in the ordinary manner by external application to the limbs or the part of the body affected.

I am aware of Deshler's salve, in which resin, suet, yellow wax, turpentine, and flaxseed-oil have been combined or compounded.

Having described this invention, what I claim is—

The combination of ingredients hereinafter specified, consisting of melted beeswax, linseed-oil, melted rosin, spirits of turpentine, oil of laurel, spirits of camphor, oil of spike, and oil of juniper, substantially as specified.

In testimony whereof I affix my signature in presence of two witnesses.

ALBERT PROCHOWICZ.

Witnesses:
W. A. FINKELNBURG,
EDW. D. KEYES.